United States Patent [19]

Yanase

[11] Patent Number: 5,760,490
[45] Date of Patent: Jun. 2, 1998

[54] ELECTRONIC UNIT FOR VEHICLE

[75] Inventor: Takeshi Yanase, Shizuoka-ken, Japan

[73] Assignee: Yazaki Corporation, Tokyo, Japan

[21] Appl. No.: 735,558

[22] Filed: Oct. 23, 1996

[30] Foreign Application Priority Data

Oct. 25, 1995 [JP] Japan ............................. 7-277839

[51] Int. Cl.[6] ................................................ H02J 1/00
[52] U.S. Cl. ................ 307/10.8; 307/10.1; 307/38; 361/641; 364/424.045
[58] Field of Search .................... 307/9.1–10.8, 307/31, 38, 39, 40, 41, 42; 364/472, 493, 423.098, 423.099, 424.034, 424.045, 424.059; 180/287; 340/825.3, 825.31, 825.34; 235/382; 361/601, 622, 627, 641

[56] References Cited

U.S. PATENT DOCUMENTS

| | | | |
|---|---|---|---|
| 4,578,591 | 3/1986 | Floyd | 307/10.1 |
| 5,257,190 | 10/1993 | Crane | 364/423.098 |
| 5,289,043 | 2/1994 | Marshall | 307/10.1 |
| 5,473,306 | 12/1995 | Adell | 307/10.8 |
| 5,481,253 | 1/1996 | Phelan | 307/10.2 |
| 5,497,322 | 3/1996 | Kolomyski | 340/825.06 |

FOREIGN PATENT DOCUMENTS

| | | |
|---|---|---|
| 59-222016 | 12/1984 | Japan . |
| 62-57521 | 4/1987 | Japan . |
| 62-59543 | 4/1987 | Japan . |
| 2-103724 | 8/1990 | Japan . |

*Primary Examiner*—Richard T. Elms
*Assistant Examiner*—Peter Ganjian
*Attorney, Agent, or Firm*—Finnegan, Henderson, Farabow, Garrett & Dunner, L.L.P.

[57] ABSTRACT

An electronic unit for a vehicle includes a control section for carrying out predetermined control management by detection signals transmitted through signal lines installed in the vehicle, a drive section for carrying out predetermined power management by control signals for said predetermined control management, which are outputted from the control section, a power branch circuit for separating one power generated from the drive section into three or more systems of power lines, and harness connecting connectors connected to terminals of the power branch circuit. Since the electronic unit per se has a "branch connecting" function of the wire harnesses, it does not require an exclusive junction box, so that the harness circuits can be simplified.

9 Claims, 2 Drawing Sheets

5,760,490

ELECTRONIC UNIT FOR VEHICLE

BACKGROUND OF THE INVENTION

The present invention relates to a power generating electronic unit for a vehicle, which carries out power control management in response to detection signals transmitted through signal cables in the vehicle.

Japanese Examined Utility Model Publication (Kokai) No. 62-57521 discloses an example of a conventional electronic unit for the vehicle that is not provided with a "branch connecting" function. Therefore, the electronic unit must be installed in an electric system of the vehicle through the intermediary of an exclusive junction box having such a branch connecting function.

One example of wiring among three systems of wire harnesses, a junction box and an electronic unit, is shown in FIG. 1.

In FIG. 1, reference numeral 20 designates a junction box which comprises power branch lines wired between a branch point P1 and a coupler 21 for connection with a wire harness, a power branch line b11 wired between the branch point P1 and a coupler 22 for connection with the harness, a power branch line f11 wired between the branch point P1 and a coupler 23 for connection with the harness, a power branch line d1 wired between the branch point P1 and a coupler 24 for connection with a box, such as an electronic unit 30, and a power branch line d2 wired between a fuse 25 on the side of power source and the coupler 24. The junction box 20 further includes a signal line a21 wired between the coupler 21 and the coupler 24, a signal line b21 wired between the coupler 22 and the coupler 24, and a signal line f21 wired between the coupler 23 and the coupler 24. In order to clarify the respective functions of the couplers, the couplers 21, 22, 23 will be referred to "the harness connecting couplers 21, 22, 23", respectively. Similarly, the coupler 24 will be referred to "box connecting coupler 24", hereinafter.

Reference numeral 30 designates the electronic unit which contains a control section 31 for executing power control management, such as fade out (FO) operations, by receiving detection signals transmitted through the signal lines a21, b21, f21, and a drive section 32 for executing power management, such as fade out (FO) operations, by receiving output signals from the control section 31. The electronic unit 30 further includes three signal lines a22, b22, f22 wired between three "input" terminals of the control section 31 and the box connecting coupler 33 respectively; and power lines d11, d21 wired between two "output" terminals of the drive section 32 and the coupler 33, respectively.

Reference numeral 40 designates a first wire harness as one system, which is wired (connected) to the harness connecting coupler 21 of the junction box 20 via. a coupler 41 for connection with the box. The wire harness 40 includes a power line a1 connected to an engine room lamp LP1 as a load, and a signal line a2 connected to a hood sensor S1 for detecting an opening/closing condition of an engine hood which is not shown in the figure.

Reference numeral 42 designates a second wire harness as another system, which is also wired to the harness connecting coupler 22 of the junction box 20 via a coupler 43. The wire harness 42 includes a power line b1 connected to a "foot" lamp LP2 as a load, and a signal line b2 connected to a front door switch S2 for detecting an opening/closing condition of not-shown front doors of the vehicle. It will be understood that the above foot lamp is provided to light up driver's and/or passenger's feet during getting on/off the vehicle.

Reference numeral 44 designates a third wire harness as the other system, which is wired to the harness connecting coupler 23 of the junction box through a coupler 45. Similarly, the wire harness 44 includes a power line f1 connected to a rear door lamp LP3 as a load, and a signal line f2 connected to a rear door switch S2 for detecting an opening/closing condition of not-shown rear doors.

The above-mentioned wiring arrangement operates as follows.

When the engine room lamp LP1, the foot lamp LP2 and the rear door lamp LP3 are respectively turned on by other systems which are not shown in the figure and when the control section 31 of the electronic unit 30 inputs the detection signals from the hood sensor S1, the front door switch S2 and the rear door switch S3 through the junction box 20 and thereafter, the section 31 carries out fade out operations to output control signals to the drive section 32, which then operates to generate power for "fade out" operation to the engine room lamp LP1, the foot lamp LP2 and the rear door lamp LP3 through the junction box 20, based on control outputs from the control section 31. In this way, the intensity of light of the lamp (s) among the lamps LP1, LP2, LP3, which are turned on by lighting control of the other system, is gradually reduced as time passes, beginning with detection of signals from the hood sensor S1, the front door switch S2 and the rear door switch S3, and so that the lamp(s) are finally turned off.

The wiring arrangement, however, requires the exclusive junction box 20 for the electronic unit 30 and complicates circuits constituted by bus-bars in the junction box 20. In addition, the circuits are lengthened and contact resistance at the couplers are increased disadvantageously.

SUMMARY OF THE INVENTION

It is therefore an object of the present invention to provide an electronic unit for a vehicle, which has a branch connecting function that does not require an exclusive junction box and which is capable of simplifying harness circuits and reducing the numbers of lines contained therein.

The object of the present invention described above can be accomplished by an electronic unit for a vehicle, comprising:

a control section for executing a specific control management program and for outputting control signals in accordance with inputted detection signals transmitted through signal lines installed in said vehicle;

a drive section electrically connected to said control section for carrying out predetermined power management of electrical loads in the vehicle by receiving control signals outputted from said control section;

a power branch circuit for separating power generated by said drive section into three or more systems of power lines; and harness connecting couplers connected to terminals of said power lines of said power branch circuit.

With the arrangement of the invention, since the electronic unit per se has the branch connecting function for wire harnesses to receive detecting signals directly from the wire harnesses and output controlled power to the wire harnesses directly through the power branch circuit, it is possible to eliminate an exclusive junction box and thereby simplify the harness circuit, so that the number of wirings can be reduced in the electric system of the vehicle.

In the present invention, preferably, the electronic unit further comprises a box connecting coupler for connection with a junction box, which is connected with the drive section.

In this case, by connecting the box connecting coupler with the unit connecting coupler of the junction box, it is possible to increase the number of branch/connecting of the wire harnesses due to the combination with the junction box.

In the electronic unit of the present invention, the harness connecting couplers are connected with wire harnesses through unit connecting couplers.

One of the wire harnesses may include a power line connected to an engine room lamp and a signal line connected to a hood sensor for detecting an opening/closing operation of an engine hood of the vehicle. Then, the power management carried out by the drive section may be a "fade out" operation of the engine room lamp.

Further, one of the wire harnesses may include a power line connected to a foot lamp and a signal line connected to a front door switch for detecting an opening/closing condition of front doors of the vehicle. Then, the power management carried out by the drive section may be a "fade out" operation of the foot lamp.

Further, one of the wire harnesses may include a power line connected to a rear door lamp and a signal line connected to a rear door switch for detecting an opening/closing condition of rear doors of the vehicle. Then, the power management carried out by the drive section may be a "fade out" operation of the rear door lamp.

These and other objects and features of the present invention will become more fully apparent from the following description and appended claims taken in conjunction with the accompany drawing.

DESCRIPTION OF THE PREFERRED EMBODIMENT

An embodiment of the present invention will be described with reference to the drawings.

Figure 1:
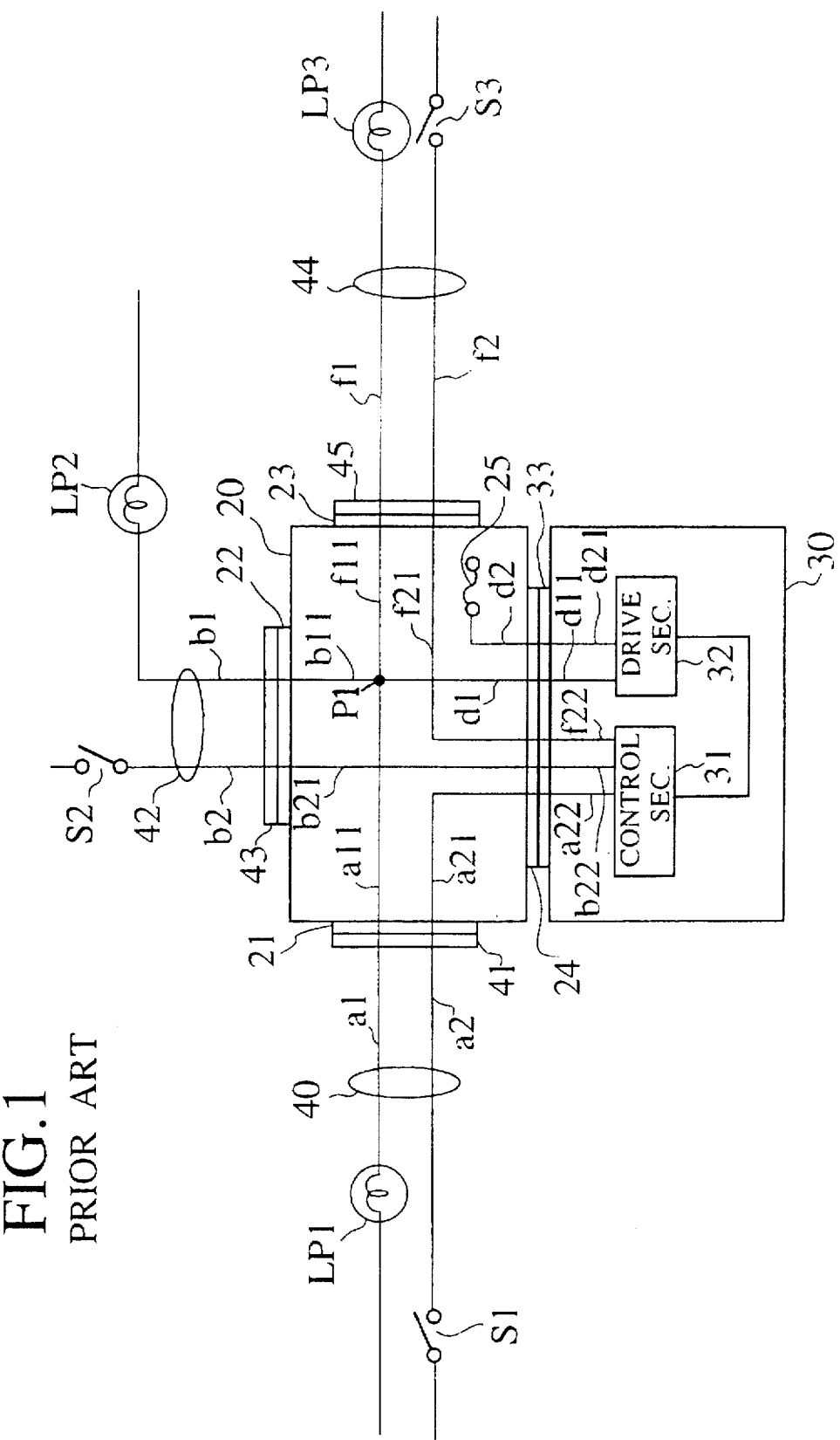
FIG. 1 is a circuit diagram illustrating harness wiring, the conventional electronic unit, and a junction box.
Figure 2:
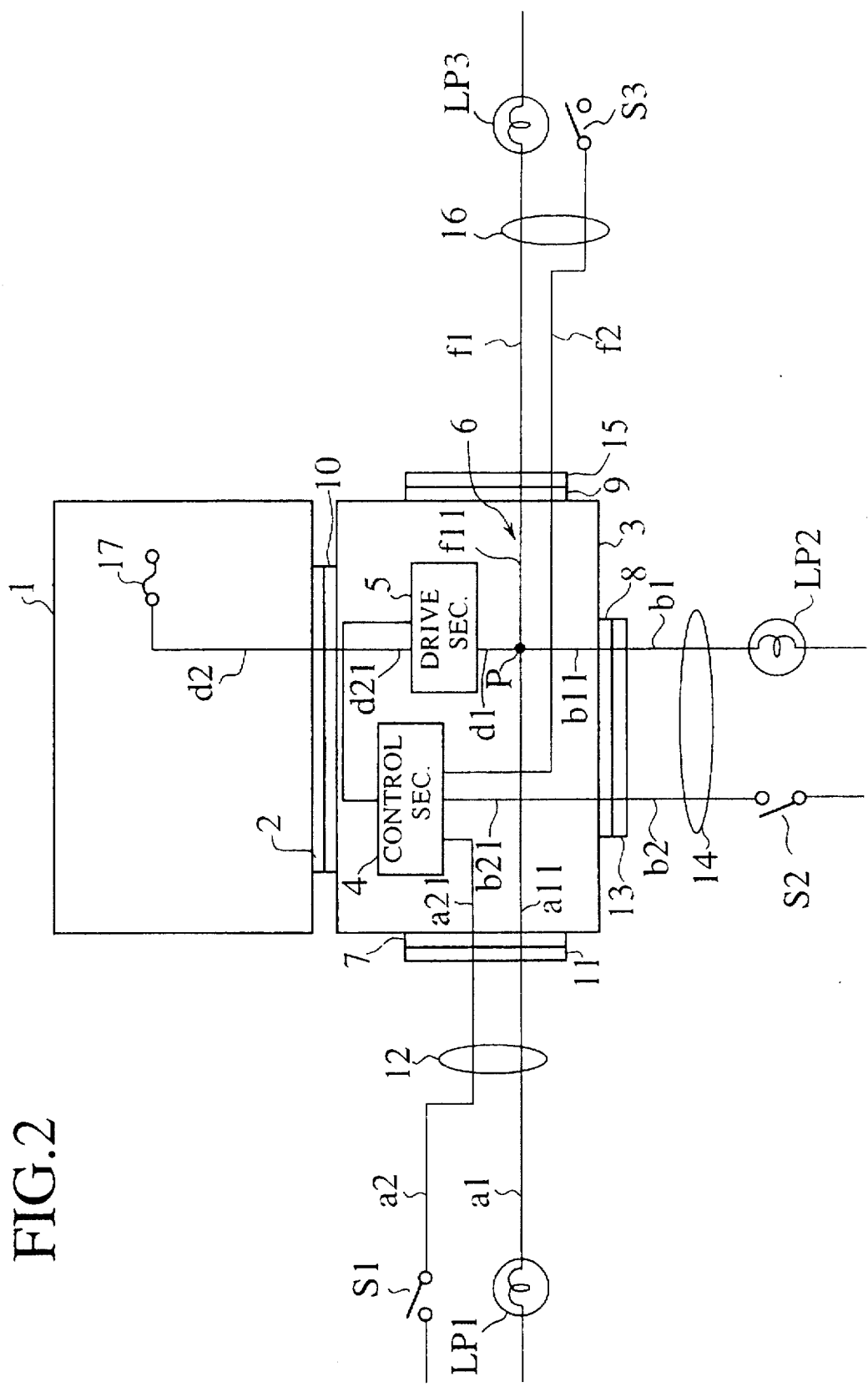
FIG. 2 is a circuit diagram illustrating harness wiring, an electronic unit in accordance with an embodiment of the present invention, and a junction box.

In FIG. 2, reference numeral 1 designates a junction box having a branch connecting function, which includes a coupler 2 for connection with an unit, a power line d2 for connecting a unit 3 with a fuse 17 on the side of power source. Although the junction box 1 may include a plurality of couplers for connection with harnesses, they are not needed in the present invention and are not shown in the figure. The coupler 2 for connection with an unit will be referred to "the unit connecting coupler 2", hereinafter.

Reference numeral 3 designates an electronic unit having a branch connecting function, which includes a control section 4 for executing power control management, such as fade out operation, by receiving signals transmitted from detecting systems installed in an automobile, a drive section 5 for executing predetermined power management, such as fade out operation, by receiving control signals transmitted from the control section 4, a power branch circuit 6 for dividing power outputted from the drive section 5 into three systems or more, three couplers 7, 8, 9 and a coupler 10. The couplers 7, 8, 9 are connected to respective terminals of the power branch circuit 6. In order to clarify functions of the couplers, the couplers 7, 8, 9 will be referred to "the harness connecting couplers 7, 8, 9", respectively, while, the coupler 10 will be referred to "the box connecting coupler 10", hereinafter.

According to the embodiment, the electronic unit 3 comprises a power branch line a11 wired between a branch point P and the harness connecting coupler 7, a power branch line b11 wired between the branch point P and the harness connecting coupler 8, a power branch line f11 wired between the branch point P and the harness connecting coupler 9, a power branch line d1 wired between the branch point P and the drive section 5, a power branch line d21 wired between the branch point P and the box connecting coupler 10, a signal line a21 wired between the harness connecting coupler 7 and the control section 4, a signal line b21 wired between the harness connecting coupler 8 and the control section 4, and a signal line f21 wired between the harness connecting coupler 9 and the control section 4.

Reference numeral 12 designates a wire harness as one system, which is wired to the harness connecting coupler 7 of the electronic unit 3 through the unit connecting coupler 11 and which includes a power line a1 connected to an engine room lamp LP1 as a load, and a signal line a2 connected to a hood sensor S1 for detecting an opening/closing operation of an engine hood (not shown).

Reference numeral 14 designates a wire harness as another system, which is wired to the harness connecting coupler 8 of the electronic unit 3 through the unit connecting coupler 13 and which includes a power line b1 connected to a foot lamp LP2 as a load, and a signal line b2 having a front door switch S2 for detecting an opening/closing condition of front doors which are not shown in the figure, too.

Reference numeral 16 designates a wire harness as another system, which is wired to the harness connecting coupler 9 of the electronic unit 3 through the unit connecting coupler 15 and which includes a power line f1 connected to a rear door lamp LP3 as a load, and a signal line f2 connected to a rear door switch S2 for detecting an opening/closing condition of not-shown rear doors.

According to the arrangement of the illustrated embodiment, when the engine room lamp LP1, the foot lamp LP2 and the rear door lamp LP3 are respectively turned on by not-shown other systems and when the control section 4 of the electronic unit 3 carries out a predetermined fade out operation by receiving the detection signals from the hood sensor S1, the front door switch S2 and the rear door switch S3 through the wire harnesses 12, 14, 16 and thereafter, the section 4 outputs control signals to the drive section 5, it generates power of fade out operations to the engine room lamp LP1, the foot lamp LP2 and the rear door lamp LP3 directly on a basis of control outputs from the control section 4. Consequently, the intensity of light of the lamp(s) among the lamps LP1, LP2, LP3, which are turned on by control of another system, is gradually reduced as time passes beginning with detecting of signals from the hood sensor S1, the front door switch S2 and the rear door switch S3, so that the lamp is finally turned off.

In this way, according to the embodiment, since the electronic unit 3 per se has respective "branch connecting" functions of the wire harnesses 12, 14, 16, it does not require an exclusive junction box having complicated circuits thereby to reduce the numbers of parts, so that the harness circuits can be simplified.

Moreover, since the electronic unit 3 of the embodiment has the coupler 10 allowing to connect with the junction box 1, it is possible to further simplify the harness circuit by connecting the wire harness of the other system having no relation to the unit 3, with the junction box 1.

Finally, it will be understood by those skilled in the art that the foregoing description is one of preferred embodiments of the disclosed electronic unit, and that various changes and modifications may be made to the present invention without departing from the spirit and scope thereof.

What is claimed is:

1. An electronic unit for a vehicle, comprising:
   a control section for executing a specific control management program and for outputting control signals in accordance with inputted detection signals transmitted through signal lines installed in said vehicle;
   a drive section electrically connected to said control section for carrying out predetermined power management of electrical loads in the vehicle by receiving control signals outputted from said control section;
   a power branch circuit for separating power generated by said drive section into three or more systems of power lines; and
   harness connecting couplers connected to terminals of said power lines of said power branch circuit.

2. An electronic unit as claimed in claim 1, further comprising a box connecting coupler for connection with a junction box, said box connecting coupler being connected with said drive section.

3. An electronic unit as claimed in Claim 1 or 2, wherein said harness connecting couplers are connected with wire harnesses through respective unit connecting couplers.

4. An electronic unit as claimed in claim 3, wherein one of said wire harnesses includes a power line connected to an engine room lamp and one of said signal lines connected to a hood sensor for detecting an opening/closing operation of an engine hood of said vehicle.

5. An electronic unit as claimed in claim 4, wherein said predetermined power management is a fade out operation of said engine room lamp.

6. An electronic unit as claimed in claim 3, wherein one of said wire harnesses includes a power line connected to a foot lamp and one of said signal lines connected to a front door switch for detecting an opening/closing condition of front doors of said vehicle.

7. An electronic unit as claimed in claim 6, wherein said predetermined power management is a fade out operation of said foot lamp.

8. An electronic unit as claimed in claim 3, wherein one of said wire harnesses includes a power line connected to a rear door lamp and one of said signal lines connected to a rear door switch for detecting an opening/closing condition of rear doors of said vehicle.

9. An electronic unit as claimed in claim 8, wherein said predetermined power management is a fade out operation of said rear door lamp.

* * * * *